United States Patent [19]
Cain et al.

[11] Patent Number: 5,718,938
[45] Date of Patent: Feb. 17, 1998

[54] BAKERY FATS AND BAKERY DOUGHS AND BATTERS CONTAINING THEM

[75] Inventors: Frederick W. Cain, Voorburg; Maarten J. Klaassen, Wormer; Bettina Schmidl, Alkmaar, all of Netherlands; Kevin W. Smith, Bedford, Great Britain

[73] Assignee: Loders Croklaan B.V., Wormerveer, Netherlands

[21] Appl. No.: 530,278

[22] PCT Filed: Feb. 14, 1994

[86] PCT No.: PCT/EP94/00429

§ 371 Date: Sep. 1, 1995

§ 102(e) Date: Sep. 1, 1995

[87] PCT Pub. No.: WO94/19953

PCT Pub. Date: Sep. 15, 1994

[30] Foreign Application Priority Data

Mar. 4, 1993 [EP] European Pat. Off. ............ 93301657.8

[51] Int. Cl.$^6$ .............................. A21D 10/00; A23D 7/00
[52] U.S. Cl. .................... 426/549; 426/606; 426/607
[58] Field of Search .................... 426/606, 607, 426/99

[56] References Cited

U.S. PATENT DOCUMENTS

| | | | |
|---|---|---|---|
| 4,316,919 | 2/1982 | Pelloso | 426/607 |
| 5,061,506 | 10/1991 | Leach | 426/549 |
| 5,158,796 | 10/1992 | Bernhardt et al. | 426/549 |
| 5,171,604 | 12/1992 | Weyland | 426/607 |
| 5,268,186 | 12/1993 | Moskowitz | 426/93 |
| 5,288,513 | 2/1994 | Cain | 426/660 |
| 5,314,707 | 5/1994 | Kester et al. | 426/611 |
| 5,374,440 | 12/1994 | Chedid | 426/549 |
| 5,405,617 | 4/1995 | Gowan, Jr. et al. | 424/464 |
| 5,405,626 | 4/1995 | Van Der Graaf | 426/556 |
| 5,419,925 | 5/1995 | Selden et al. | 426/611 |
| 5,424,091 | 6/1995 | Cain | 426/607 |
| 5,431,948 | 7/1995 | Cain | 426/98 |
| 5,439,700 | 8/1995 | Cain | 426/99 |

FOREIGN PATENT DOCUMENTS

| | | |
|---|---|---|
| 218277 | 4/1987 | European Pat. Off. |
| 268431 | 5/1988 | European Pat. Off. |
| 91/9533 | 7/1991 | WIPO |

OTHER PUBLICATIONS

Akoh, "Lipid–Based Fat Substitutes," Critical Reviews in Food Science and Nutrition, vol. 35(5), pp. 405–430 (1995).

Drewnowski et al., "Food Preferences in Human Obesity: Carbohydrates Versus Fats," Appetite, vol. 18, pp. 207–221 (1992).

Ramirez, "Chemoreception for Fat: Do Rats Sense Triglycerides Directly?," Appetite, vol. 18, pp. 193–206 (1992).

Hamosh et al., "Lipolytic Activity of Human Lingual Glands (Ebner)," Laboratory Investigation, vol. 37, pp. 603–608 (1977).

Gilbertson, "The Physiology of Vertebrate Taste Reception," Current Opinion in Neurobiology, vol. 3, pp. 532–537 (1993).

Ordway et al., "Direct Regulation of Ion Channels by Fatty acids," Trends in Neuroscience, vol. 14(3), pp. 96–100 (1991).

Honoré et al., "External Blockade of the Major Cardiac Delayed Rectifier $K^+$ Channel (Kv1.5) by Polyunsaturated Fatty Acids," Proceedings of the National Academy of Science, USA, vol. 91, pp. 1937–1941 (1994).

Kinnamon, "Role of $K^+$ Channels in Taste Transduction," in Sensory Transduction, Rockefeller Univ. Press, pp. 261–270 (1992).

Bigiani et al., "Membrane Properties and Cell Ultrastructure of Taste Receptor Cells in Necturus Lingual Slices," Journal of Neurophysiology, vol. 75, pp. 1944–1956 (1996).

Gilbertson et al., "Fatty Acid Modulation of $K^+$ Channels in Taste Receptor Cells: Gustatory Cues for Dietary Fat," submitted to American Journal of Physiology: Cell Physiology, 1996.

Montgne 1961 Larousse Gastronomique Crown Publishers Inc New York pp. 816, 350–356.

Swern 1979 Baileys Industrial Oil & Fat Products vol. 1 4th Ed. pp. 352–403.

The American Heritage Dictionary 1982 Houghton Mifflen Company pp. 162 and 420.

*Primary Examiner*—Carolyn Paden
*Attorney, Agent, or Firm*—Cushman Darby & Cushman IP Group Pillsbury Madison & Sutro LLP

[57] ABSTRACT

The invention concerns bakery doughs or batters comprising the conventional ingredients, wherein, however, the fat applied displays:

a SAFA content of less than 40 wt. %;

an $N_{20}$ (unstab., NMR pulse) of $\geq 10$, while the triglyceride composition is:

$S_2U$=5–50 wt. %;

$(U_2S+U_3)$>35 wt. %;

$S_3$=0–37 wt. %,

S being saturated fatty acid $C_1$–$C_{24}$;

U being unsaturated fatty acid $C_{18+}$.

11 Claims, No Drawings

5,718,938

BAKERY FATS AND BAKERY DOUGHS AND BATTERS CONTAINING THEM

BACKGROUND OF INVENTION

Bakery doughs and bakery batters that can be used for the preparation of such bakery products as cakes, cookies, croissants, loaves, breadrolls, biscuits, puff pastries etc. are products containing fat, water, flour and optionally eggs and such leavening agents as yeast as the main ingredients.

Conveniently, these products comprise about 5–80 wt. % of fat, 0–50 wt. % of water, 0–30 wt. % of egg, 0–15 wt. % of leavening agent, 0–40 wt. % of sugar, 0–4 wt. % of salt and 20–80 wt. % of flour.

The fats applied so far in these products are triglyceride compositions having a fairly high SAFA content. SAFA content is defined as the weight ratio of the total of saturated and trans-fatty acid residues taken as the total of all fatty acid residues present in the fat. Normal SAFA levels of dough or batter fats are 50 wt. % or more. In such laminate fats as are applied for the production of puff pastries or croissants, the SAFA levels are even higher, i.e. at least 60 wt. %.

In the present trend towards healthier bakery products, there is a great demand for doughs and batters in which a healthier fat is present, while the baking performance of the products should remain as good as that of the high SAFA products.

SUMMARY OF INVENTION

We have now found fat-compositions that can be applied in bakery doughs or batters, resulting in lower SAFA products while the properties of the baked products are at least similar to those of the higher SAFA products.

Therefore, our invention concerns bakery fat compositions, comprising a mixture of triglycerides of the type $U_3$; $S_2U$; $U_2S$ and $S_3$ in amounts of:

5–50 wt % $S_2U$ at least 35 wt % $(U_2S+U_3)$

0–37 wt % $S_3$ which fat compositions display a SAFA content of less than 35 wt % and an $N_{20}$ (unstabilised, NMR-pulse) of at least 10 and which fat compositions contain less than 5 wt % of trans-fatty acids, wherein S means saturated or trans-fatty acid residues with 12–24 C-atoms and U means mono (cis) or polyunsaturated fatty acid residues with at least 18 C-atoms.

DETAILED DESCRIPTION OF INVENTION

The above compositions are novel over the fat compositions disclosed in EP 268 431. According to this document, migration inhibitors for baked food products contain at least 10 wt % of a di-saturated mono-unsaturated mixed triglyceride, wherein at least one fatty acid residue among the three constituent fatty acids thereof is a saturated fatty acid with 20–24 C-atoms. From the examples it can be calculated that the fat compositions have a SAFA level of at least 37 wt %. The fats are not applied as a dough fat, but as a migration-inhibitor for foods-containing oleaginous ingredients.

According to EP 218 277 edible water-in-oil emulsions comprising 15–75% of a fat phase are known, wherein the fat has the following solids profile:

$N_5$–$N_{15}$=30–70;

$N_{20}$=15–35;

$N_{30}$=2–16;

$N_{35}$=0–10 the balance up to 100% consisting of an aqueous phase, containing 5–60% of a soluble humectant, comprising at least one polyol.

The emulsions can be used as reduced fat bakery-emulsions, in particular for cake batters. According to the examples the fats comprise soybean oil (17%); palm oil (20%), hardened soybean oil 36° C. (13%) and hardened fish oil 39° C. (50%). The fats have an $N_{20}$=29 and an $N_{30}$=10.

Our compositions are substantially free of hardened fats (maximum trans-content of 5 wt %), while its SAFA level is restricted to at most 35 wt %. Moreover, our compositions do not comprise a humectant.

In WO 91/09533 an all-purpose plastic shortening is disclosed, wherein the fat, however, contains at least 45 wt % of trans acids.

Our invention further concerns bakery dough or batter comprising 5–80 wt. % of fat, 0–50 wt. % of water, 0–30 wt. % of egg, 0–15 wt. % of leavening agent, 0–40 wt. % of sugar, 0–4 wt. % of salt and 20–80 wt. % of flour, wherein the fat is a mixture of triglycerides, which mixture displays:

a SAFA content of less than 40 wt. %, preferably less than 35 wt. %;

an $N_{20}$ (unstab., NMR pulse) of at least 10, preferably at least 15, more preferably 15–50, most preferably 20–30, the triglyceride mixture comprising at least triglycerides of the $U_3$, $S_2U$, $U_2S$ and $S_3$ type, which triglycerides are present in amounts of:

$S_2U$=5–50 wt. %, preferably 14–25 wt. %;

$(U_2S+U_3)$: >35 wt. %, preferably 45–90 wt. %;

$S_3$=0–37 wt. %, preferably 1–20 wt. %, wherein

S means saturated or trans-fatty acid residues having 12–24 C atoms, preferably 18–22 C atoms;

U means mono(cis) or polyunsaturated fatty acid residues having at least 18 C atoms, preferably $C_{18:1}$ or $C_{18:2}$;

SAFA content is the total of saturated and trans-fatty acid residues taken over the total of all fatty acid residues (wt/wt);

$N_{20}$ is the Solid Fat Index at 20° C., measured according to NMR pulse, unstabilized.

Furthermore, it was found that the $N_{30}$ (unstab., NMR pulse) of the fat mixture also has an impact on the product performance. Fat mixtures displaying an $N_{30}$ (unstab., NMR pulse) of less than 20, preferably less than 15, more preferably less than 5 have been found to give excellent results.

The fats applied in our doughs and batters are low in SAFA. However, preferred fats are also low in trans-fatty acids. It is preferred that the fat mixture should contain less than 5 wt. %, preferably less than 1 wt. %, of trans-fatty acid residues.

The fats that can be applied are suitably obtained from chemical or enzymic interesterification, optionally followed by fractionation of 1) a hardened fat selected from the group consisting of hardened palm oil, hardened rapeseed oil, hardened high stearic rapeseed oil, hardened sunflower oil, hardened soybean oil or hardened cottonseed oil and 2) a liquid oil selected from the group consisting of groundut oil, sunflower oil, rapeseed oil, soybean oil, maize oil, cottonseed oil, high oleic sunflower oil and olive oil.

If the fats are obtained by enzymic interesterification, optionally followed by fractionation, it is preferred to apply fats obtained from the interesterification of a liquid oil having an ($SU_2+U_3$) content of at least 35 wt. %, preferably at least 70 wt. %, and a saturated fatty acid having 12-24 C atoms.

Thus, in this case the reactants are a fat and a free fatty acid. It should be noted that the free fatty acid can also be replaced by a free fatty acid ester, in particular one derived from alcohols having 1-6 C atoms.

If the fats are obtained from enzymic interesterification of two fats, it is preferred to use a fat obtained by enzymic interesterification, optionally followed by fractionation, of 1) a liquid oil selected from sunflower oil, high oleic sunflower oil, rapeseed oil, soybean oil, olive oil, maize oil and 2) a triglyceride composition having an $S_3$ content (S=saturated fatty acid having 12-24 C atoms) of at least 50 wt. %, preferably at least 80 wt. %.

The fat mixture applicable in our doughs and batters is, however, preferably a blend of components A, B and C, wherein A contains >50% SUS triglycerides, preferably 70 wt. %;

B contains >25 wt. % of $S_3$ triglycerides, preferably >40 wt. %;

C contains more than 40 wt. % of ($U_2S+U_3$) triglycerides, preferably >60 wt. %, A, B and C being present in amounts of 10-60 wt. % of A;

0-30 wt. % of B, preferably 2-25 wt. %;

35-90 wt. % of C.

In particular, fat mixtures wherein fat A has a weight ratio ($C_{18}+C_{20}+C_{22}$):$C_{16}$>0.25, preferably >5, more preferably >15 are applied.

Examples of such fats are enzymically made fats obtained by enzymic conversion of 1) a fully hardened high erucic rapeseed oil or fully hardened fish oil and 2) a liquid oil, such as sunflower oil, high oleic sunflower oil, soybean oil, maize oil, olive oil.

Fats B are preferably obtained from the fractionation of palm oil as top fraction. Palm oil stearin obtained in that way is a natural fat that contains about 75 wt. % of $S_3$, its SAFA value being about 80%.

Other examples of fat B are fully hardened vegetable fats, e.g. hardened rapeseed oil of melting point 70° C.; hardened palm oil of melting point 58° C.; hardened soybean oil of melting point 65° C., hardened cottonseed oil, hardened groundnut oil or hardened corn (or maize) oil. Very suitable hardstocks are those rich in ($H_2M+M_2H$) triglycerides, H being saturated fatty acid having 16-24 C atoms, M being saturated fatty acid having 8-14 C atoms.

Fats C are fats that are very low in SAFA (e.g. 10% for sunflower oil) and are therefore applied in order to lower the SAFA level of the blend of fats A and B. Typical examples of fats C are fats selected from the group consisting of sunflower oil, soybean oil, rapeseed oil, palm oil olein, high-oleic sunflower oil, high-oleic rapeseed oil, corn oil, grapeseed oil, groundnut oil, olive oil or cottonseed oil. However, also enzymically made fats high in BOO, BlnIn, BlnO, AOO, AlnIn or AlnO can be applied as fat C. It is surprising to find that these fats C, which are often liquid, can be applied in fat mixtures suitable for bakery doughs or bakery batters.

Typical examples of fat compositions that can be applied are given in Table 1.

TABLE I

| Component Fat | BOB | StOSt | BlnB | BOO | StOO | BlnIn | $O_3$ | $Ln_3$ | % SAFA | $N_{20}$ |
|---|---|---|---|---|---|---|---|---|---|---|
| 1 | | 7 | | | 80 | | 13 | | 31.3 | 19.6 |
| 2 | | 5 | | 60 | | | 35 | | 23.3 | 19.8 |
| 3 | 8 | | | | 80 | | 12 | | 32.0 | 21.6 |
| 4 | 6.5 | | | 48.5 | | | 45 | | 20.5 | 19.7 |
| 5 | | | 14 | | | 68 | | 18 | 32 | 24.3 |
| 6 | | | 14 | | | 60 | | 26 | 29.3 | 20.9 |
| 7 | 1 | | 7 | 38 | | 25 | 15 | 14 | 26.3 | 23.2 |
| 8 | | 50 | | | | | 50 | | 33.3 | 47.0 |
| 9 | 8 | | | | 82 | | 10 | | 32.7 | 25.1 |
| 10 | 6 | | | 50 | | | 44 | | 20.7 | 19.5 |
| 11 | 2 | | 8 | 37 | | 20 | 17 | 16 | 25.7 | 25.3 |
| 12 | 11 | | | | 80 | | 9 | | 34.0 | 34.6 |
| 13 | 7 | | | 60 | | | 33 | | 24.7 | 33.0 |
| 14 | | | 20 | | | 50 | | 30 | 30.0 | 28.5 |
| 15 | | | 13 | | | 86 | | 1 | 37.3 | 34.7 |
| 16 | | | 8 | 40 | | 20 | 15 | 14 | 27.3 | 31.5 |

Although many examples of fat A can be given, a preference is expressed for the use of cocoa butter or cocoa butter substitutes, e.g. shea stearin, palm oil mid-fraction, illipe, mixtures of these as fat A. Enzymically made cocoa butter equivalents or fractions thereof, either per se or admixed with the above-mentioned natural fats, can be applied as well.

Very suitable fats are those having a relatively high content of at least one of the following triglycerides: BOB; BlnB; AOA; AOB; AlnA (A=arachidic acid; B=behenic acid; O=oleic acid).

Fats A that have particular advantages, e.g. because their caloric value is even less than that of the above-mentioned fats, are fats A that contain 5-30 wt. % of $C_{22}$ fatty acid residues.

Natural (vegetable) fats often contain some amounts of triterpene alcohol esters (TTAE). However, the use of fats low in these compounds is preferred. Therefore, our fat mixtures preferably contain less than 3 wt. %, preferably less than 0.5 wt. %, of triterpene alcohol esters.

Our invention also concerns such bakery products as cakes, cookies, croissants, loaves, breadrolls, biscuits or puff pastries made of a dough or batter, at least partly Consisting of the dough or batter as described hereinbefore.

EXAMPLES

1. Two fat blends were prepared by mixing of the components.

Blend I consisted of:

30 wt. % of shea stearin (=fat A);

65 wt. % of sunflower oil (=fat C);
5 wt. % of palm oil stearin (=fat B).
Fat A was characterized by:
Stearic content=61 wt. %;
Palmitic content=3 wt. %;
SUS content=90 wt. %;
SAFA content=70 wt. %;
TTAE=about 0.5 wt. %.
Fat B was characterized by:
$S_3$ content=75 wt. %;
SAFA content=80 wt. %.
Fat C was characterized by:
SAFA content 10 wt. %.
This blend I displayed:
$N_{20}$ (unstab.)=20.6;
$N_{30}$ (unstab.)=4.3;
$N_{35}$ (unstab.)=1.4
The SAFA content was 31 wt. %.
Blend II consisted of:
30 wt. % of palm olein −37 (fat D);
70 wt. % of wet-fractionated palm oil olein (fat E).
Fat D was characterized by:
Total SAFA+trans-content=85 wt. %.
Fat E was characterized by:
SAFA content=40 wt. %.
Blend II displayed:
$N_{20}$ (unstab.)=21.1;
$N_{30}$ (unstab.)=4.5;
$N_{35}$ (unstab.)=0.
The SAFA content was 52 wt. %.
2.1 Biscuits were prepared, using the following recipe:

|  | wt. % |
|---|---|
| Fat | 29.75 |
| Water | 5.25 |
| Sugar | 22 |
| Eggs | 2 |
| Flour | 41 |
| Salt | trace |
|  | 100 |

2.2 Process
Preparation of fat
1. The components were blended at abt. 50° C.;
2. The fat was cooled from 50° C. to abt. 8° C., with constant stirring, until a homogeneous mass had been obtained.
3. The fat was transferred to a container and stored in the refrigerator overnight.

COMMENTS

The SHs/SF/POs blend had a very plastic texture which kept its structure when left to stand at room temperature.
2.3 Preparation of biscuits
1. The fat and the sugar were mixed thoroughly, followed by addition of salt.
2. Water and eggs were added and blended in.
3. Flour was added and mixed in until a dough had formed.
4. The dough was allowed to firm in the refrigerator.
5. The dough was worked to give biscuits.
6. The dough was baked at 175° C. for 20 minutes.
Biscuits were made, using fat blend I and fat blend II.

2.4. Evaluation

Both biscuits were presented to an expert taste panel, who found them to have:

1. good texture
2. good snap
3. good aroma
4. good flavour release

The SHs/SF/POs biscuits were slightly harder and were less crumbly than the reference (=fat blend II).

3. Preparation of a puff-pastry 3.1 Preparation of the fat

A fat blend with the following triglyceride composition was made:

| BOB | 12.5 wt % |
|---|---|
| BOO | 5.0 wt % |
| StOSt | 17.5 wt % |
| Palm oil stearin | 10.0 wt % |
| Sunflower oil | 55.0 wt % |

The above blend was made from an enzymically-made BOB-rich product (containing 73% of BOB); an enzymically-made BOO-rich product (containing 61% of BOO); an StOSt-rich proudct (84 wt % of StOSt); palm oil stearin and sunflower oil. The blend was plasticized by cooling. It displayed the following characteristics:

| $N_{20}$ (not stab.) | 24.5 |
|---|---|
| $N_{30}$ (ibid.) | 18.5 |
| $N_{35}$ (ibid.) | 5.6 |

Its main fatty acid components were:

| $C_{16:0}$ | 12.4 wt % |
|---|---|
| $C_{18:0}$ | 13.2 wt % |
| $C_{18:1}$ | 25.0 wt % |
| $C_{18:2}$ | 36.8 wt % |
| $C_{22:0}$ | 10.7 wt % |
| trans fatty acids | 0 |
| SAFA | 37.8 wt % |

Its main triglyceride components were:

| SSS | 7.6 |
|---|---|
| SOS | 27.7 |
| OSS | 2.0 |
| SLS | 3.5 |
| SOO | 6.3 |
| OOO | 45.3 |
| Total: |  |
| $U_2S$ | 13.3 |
| $S_2U$ | 33.5 |
| $U_3$ | 45.3 |
| $S_3$ | 7.6 |

3.2 Preparation of puff-pastry

A dough was made according to the following recipe:

|  | gram | wt % |
| --- | --- | --- |
| patent flour | 500 | 39.1 |
| fat | 425 | 33.2 |
| water | 350 | 27.3 |
| salt | 5 | 0.4 |

The fat is mixed with the flour manually (according to the "Dutch" method). This mix is cut in cubes of about 1 cm. The cubes are mixed with water in a Hobart mixer at low speed (45 sec). The dough is rolled to a thickness of 2 cm and folded to obtain rectangular dough pieces of 4 layers. This rolling and folding is repeated six times. Puff-pastries were baked from the dough (18 min at 220° C.). The puff-pastries displayed good sensory characteristics (according to a sensory test panel evaluation). The lift of the pastries was 17.0 mm (average from 12 measurements).

We claim:

1. Bakery dough or batter, said dough or said batter comprising 5–80 wt. % of fat, 0–50 wt. % of water, 0–30 wt. % of egg, 0–15 wt. % of leavening agent, 0–40 wt. % of sugar, 0–4 wt. % of salt and 20–80 wt. % of flour, wherein the fat is a mixture of triglycerides, which mixture displays:

a SAFA content of less than 40 wt. %;

an $N_{20}$ (unstab., NMR pulse) of at least 10, the triglyceride mixture comprising at least triglycerides chosen from $U_3$, $S_2U$, $U_2S$ and $S_3$, which triglycerides are present in amounts of:

$S_2U$=5–50 wt. %;

$(U_2S+U_3)$: >35 wt. %;

$S_3$=0–37 wt. %, wherein

S means saturated or trans-fatty acid residues having 12–24 C atoms;

U means mono(cis) or polyunsaturated fatty acid residues having at least 18 C atoms;

SAFA content is the total of saturated and trans-fatty acid residues taken as the total of all fatty acid residues (wt/wt);

$N_{20}$ is the Solid Fat Index at 20° C., measured according to NMR pulse, unstabilized, said fat mixture comprising a blend of components A, B and C, wherein A contains >50% SUS triglycerides;

B contains >25 wt. % of $S_3$ triglycerides;

C contains more than 40 wt. % of $(U_2S+U_3)$ triglycerides, A, B and C being present in amounts of 10–60 wt. % of A;

0–30 wt. % of B;

35–90 wt. % of C.

2. Bakery dough or batter according to claim 1, wherein fat A in said dough or said batter has a weight ratio $(C_{18}+C_{20}+C_{22}):C_{16}$>0.25.

3. Bakery dough or batter according to claim 1 or 2, wherein fat A in said dough or said batter is a shea fraction, illipe, a fat having a high content of at least one of the triglycerides, BOB, AOA; AOB (B=behenic, A=arachidic, O=oleic) or a cocoa butter equivalent.

4. Bakery dough or batter according to claim 1, wherein the fat A in said dough or said batter contains 5–30 wt. % of $C_{22}$ fatty acid residues.

5. Bakery dough or batter according to claim 1, wherein fat A in said dough or said batter is obtained by enzymic conversion of 1) a fully hardened, high erucic rapeseed oil or fully hardened fish oil and 2) a liquid oil such as sunflower oil, high oleic sunflower oil, soybean oil, maize oil, olive oil.

6. Bakery dough or batter according to claim 1, wherein fat B in said dough or said batter is selected from a palm oil stearin fraction, a hardened palm oil of melting point 58° C., a hardened rapeseed oil of melting point 70° C., or a hardstock rich in $(H_2M+M_2H)$ fats, H being saturated fatty acids having 16–24 C atoms, M being saturated fatty acids having 8–14 C atoms.

7. Bakery dough or batter according to claim 1, wherein fat C in said dough or said batter is selected from the group consisting of sunflower oil, soybean oil, rapeseed oil, palm oil olein, high-oleic sunflower oil, high-oleic rapeseed oil, corn oil, grapeseed oil, groundnut oil, olive oil, cottonseed oil or enzymically made fats high in BOO, AOO contents (B=behenic, A=arachidic, O=oleic).

8. Bakery dough or batter according to claim 1 wherein A contains >70 wt. % triglycerides, B contains >40 wt. % $S_3$ triglycerides, and C contains >60 wt. % of $(U_2S+U_3)$ triglycerides.

9. Bakery dough or batter said dough or said batter comprising 5–80 wt. % of fat, 0–50 wt. % of water, 0–30 wt. % of egg, 0–15 wt. % of leavening agent, 0–40 wt. % of sugar, 0–4 wt. % of salt and 20–80 wt. % of flour, wherein the fat is a mixture of triglycerides, which mixture displays:

a SAFA content of less than 40 wt. %;

an $N_{20}$ (unstab., NMR pulse) of at least 10, the triglyceride mixture comprising at least triglycerides chosen from $U_3$, $S_2U$, $U_2S$ and $S_3$, which triglycerides are present in amounts of:

$S_2U$=5–50 wt. %;

$(U_2S+U_3)$: >35 wt. %;

$S_3$=0–37 wt. %.

wherein

S means saturated or trans-fatty acid residues having 12–24 C atoms;

U means mono(cis) or polyunsaturated fatty acid residues having at least 18 C atoms;

SAFA content is the total of saturated and trans-fatty acid residues taken as the total of all fatty acid residues (wt/wt);

$N_{20}$ is the Solid Fat Index at 20° C., measured according to NMR pulse, unstabilized, the fat mixture containing less than 3 wt. % of triterpene alcohol esters (=TTAE).

10. Baked bakery products including cakes, cookies, croissants, loaves, breadrolls, biscuits or puff pastries made of a dough or batter, at least partly consisting of the dough or batter according to claim 1 or claim 9.

11. Bakery dough or batter according to claim 1 or claim 9 in which triglycerides in said dough or said batter are present in amounts of:

$S_2U$=14–25 wt. %;

$(U_2S+U_3)$=45–90 wt. %; and $S_3$=1–20 wt. %, wherein S has 18–22 C atoms, and U is $C_{18:1}$ or $C_{18:2}$.

* * * * *